UNITED STATES PATENT OFFICE.

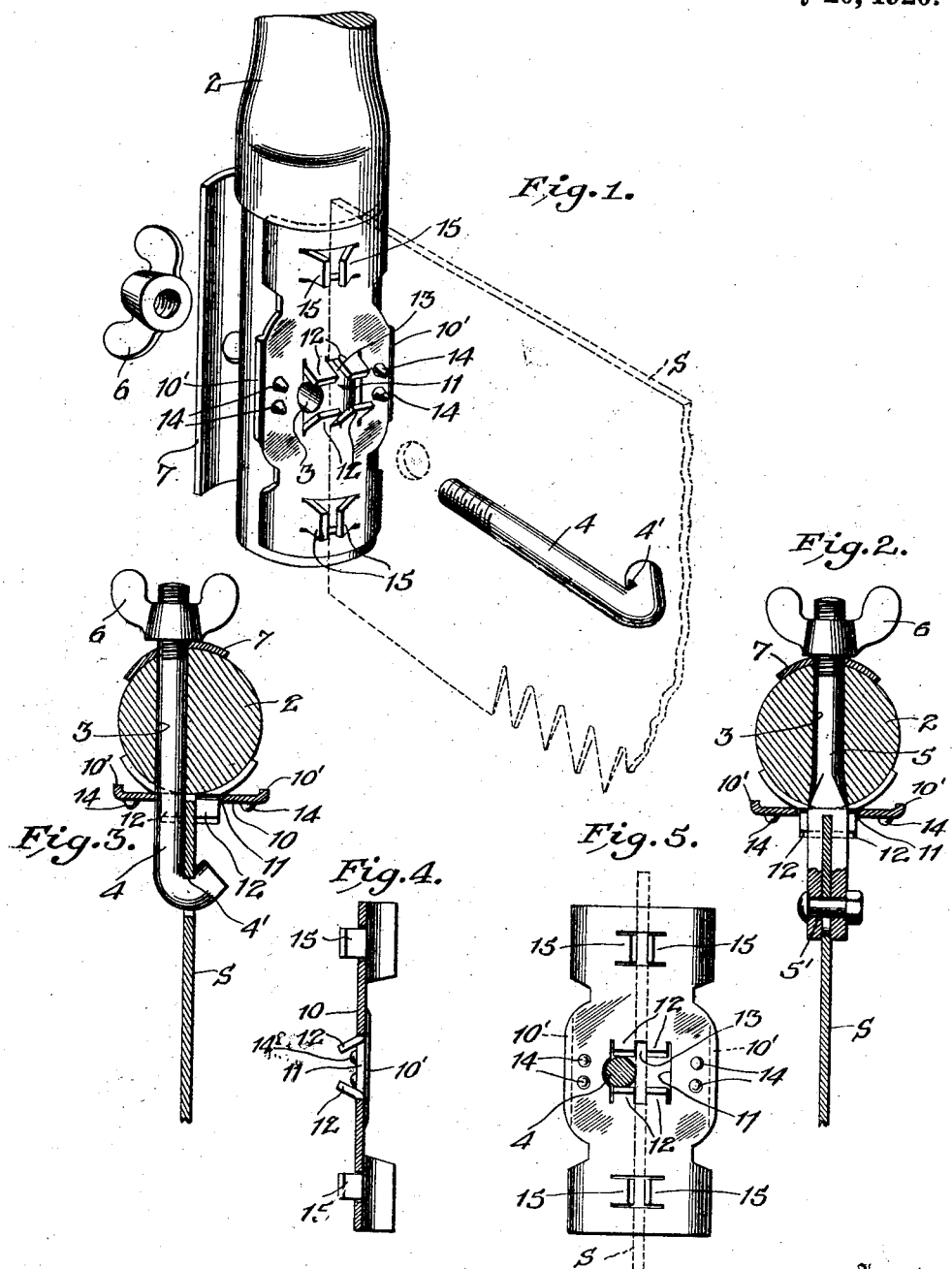

PERCY C. ABBOTT, OF DUMBARTON, VIRGINIA, ASSIGNOR TO HARDWARE SPECIALTY CO., INC., OF RICHMOND, VIRGINIA, A CORPORATION OF VIRGINIA.

SAW-HANDLE.

1,347,432.　　　　Specification of Letters Patent.　　Patented July 20, 1920.

Application filed September 30, 1918. Serial No. 256,296.

*To all whom it may concern:*

Be it known that I, PERCY C. ABBOTT, a citizen of the United States, residing at Dumbarton, in the county of Henrico and State of Virginia, have invented certain new and useful Improvements in Saw-Handles; and I do hereby declare the following to be a full, clear, and exact description of the invention, such as will enable others skilled in the art to which it appertains to make and use the same.

This invention relates to saws and more particularly to saw handles.

It is one of the objects of the present invention to provide a simple, practicable, inexpensive and durable butt-plate or member against which the end of a cross-cut saw may be firmly secured in a position either parallel to the axis of the handle or transverse to the same. It is also an object of the present invention to provide a handle comprising clamping members consisting of a butt-plate against which the end of the saw may rest and which will enable the utilization of a threaded hook or a slitted bolt by which the parts may be held assembled. It is also an object of the invention to provide a butt-plate against which the end of the saw may be clamped in positions at right angles to each other without necessitating the turning of the plate with respect to the stock of the handle.

With these and other objects in view as will be rendered manifest to those skilled in the art, the invention consists of the construction, the combination, and in details and arrangements of the parts as will be more particularly described hereinafter relative to the embodiment of the invention illustrated in the accompanying drawing in which—

Figure 1 is a perspective view of the device showing a saw in dotted line.

Fig. 2 is a cross sectional view of the device showing the saw being held in position by a slitted bolt.

Fig. 3 is a similar view showing the saw held by a hook-bolt.

Fig. 4 is a longitudinal central section through the plate.

Fig. 5 is a plan view of the plate.

In the drawings a suitable handle 2 of wood or other material is provided and has its lower portion transversely perforated as at 3 for the purpose of receiving a fastening hook or bolt which members are shown at 4 in Figs. 3 and 5 in Fig. 2, each being threaded at one end to receive a wing-nut 6. This wing-nut is adapted to be screwed up tight against a washer or wearplate 7 which may be of any suitable construction and material while the operative end of the fastening member 4 or 5 is adapted to draw the end of the saw blade S tightly up against a butt-plate 10 fitted on the side of the handle 2 opposite to the washer 7.

The butt-plate 10 preferably consists of a sheet metal member the central portion of which is plane both longitudinally and transversely so as to afford a snug and firm support for the straight end of the saw blade S. The central portion of the butt-plate 10 is perforated as at 11 to readily receive the fastening members 4 or 5 and the transverse edges of the perforation 11 are each provided with pairs of tongues or lugs 12 the adjacent edges of which are spaced as at 13 in the longitudinal center of the plate to receive the edge of the saw and to guide the same while the corners of the end of the saw are also supported and guided in guideways between parallel edges of pairs of upwardly-struck tongues 15 which, by extending well above the plane of the butt member, form a firm rest for the blade and hold it against lateral movement or slippage.

The blade of the saw may be disposed longitudinally of the butt-plate 10 by arrangement between the tongues 15 and the notched pairs of lugs 12 or when desired the saw may be disposed transversely to the butt-plate 10 by insertion between the opposed faces of the transverse lugs 12 and for holding the edge of the saw against slippage or movement suitable means may be provided adjacent the longitudinal edges of the central portion of the plate, this means consisting for instance as the embossment or lugs 14 formed in pairs near the edges of the plate.

The ends of the saw blades are usually provided with one or more apertures to receive a hook 4 for instance or to receive a bolt 5′ which may be passed through the end of the slitted bolt 5 when the saw edge has been abutted against the butt-plate head.

It will be observed that the transverse section of the plate 10 at its middle portion is plane as is also the longitudinal central section of the plate and that the ends of the plate are bent to conform approximately to the shape of the handle 2. A plate of this shape and method of construction enables the manufacture of a quantity of the members by the utilization of a minimum amount of stock or material and the consequent production of the members at a minimum expense as the entire butt member may be made at substantially a single operation and thus produced in large quantities in a short period of time. If desired the intermediate portion of the longitudinal edges of the plate 10 may be flanged back at 10' so as to stiffen the member.

For the purpose of increasing the firmness with which the saw is held to the clamp the hook 4 is shown as provided with a rectangular seat 4' into which the wall of the aperture in the saw is snugly seated when the bolt is tightened up.

A butt plate as described and shown is strong and is adapted to be manufactured at low cost. It is also adapted to receive either of the common types of bolt clamps 4 or 5. The hole which either bolt is adapted to pass through is made by striking up the pairs of tongues or lugs 12. These tongues are of a length to meet if bent down into the surface of the plate and the tongues of each pair struck up from the plate have their opposing ends separated sufficiently to admit the passage of the clamp bolts, and the pairs are separated from each other to provide between their side edges a seat for the saw butt. Substantially no metal is scrapped therefore in making the bolt hole. Guide lugs or tongues struck up in this manner enable a deep firm guiding seat for the saw to be formed without weakening the plate by transverse crimping or complicating the process of manufacture. By the construction shown, moreover, a strong, rigid plate is produced from sheet metal, adapted to constitute a firm and rigid seat for the butt end of a cross cut saw either in the plane of the handle or transversely thereof. The plate is stamped with curved ends to fit the handle and has midway of its ends a flat section reinforced by the flanges 10', and having the guide lugs 14 well spaced whereby when the bolt 5 is turned 90° from the position shown in Fig. 2, the saw may be held to a firm seat crosswise of the handle.

What I claim is:

1. A sheet metal butt plate for cross cut saw handles having seating means for the butt end of a saw comprising pairs of struck up tongues, said pairs being spaced apart to provide for the admission of the saw butt longitudinally of the plate and said tongues being located and the ends of the tongues of each pair being spaced so as to admit the passage of a clamp bolt.

2. A sheet metal butt plate for cross cut saw handles having seating means for the butt end of a saw, comprising pairs of struck-up tongues, said pairs being spaced apart to provide for the admission of the saw butt longitudinally, said tongues being located and the ends of the tongues of each pair being spaced so as to admit the passage of a clamp bolt, either concentric with the orifice formed by the struck-up tongues or on either side of the saw.

3. A sheet metal butt plate for cross cut saw handles having a flat central portion, spaced-apart pairs of struck-up tongues forming between them a seat for a saw butt lengthwise of the plate, said tongues being located and the tongues of each pair being spaced from each other so as to permit the passage of a clamp bolt between them, guide lugs alined with the space between the pairs of struck up tongues, and guide lugs on said flat central portion at each side of said struck-up tongues alined with the space between the tongues of said pairs, whereby the saw handle may be secured in the plane of the saw or transversely thereof.

4. A sheet metal butt plate for cross cut saw handles having a flat central portion reinforced by flanges and having rounded ends adapted to fit a saw handle, spaced apart pairs of struck-up tongues forming between them a seat for a saw butt lengthwise of the plate, said tongues being located and the tongues of each pair being spaced from each other so as to admit the passage of a clamp bolt, guide lugs arranged in alinement with the space between said pairs of tongues and guide lugs on said flat portion at each side of the struck-up tongues and in alinement with the space between the tongues of said pairs, whereby the saw handle may be secured in the plane of the saw or transversely thereof.

In testimony whereof I affix my signature.

PERCY C. ABBOTT.